United States Patent [19]

Aritomi et al.

[11] Patent Number: 4,724,257
[45] Date of Patent: Feb. 9, 1988

[54] AROMATIC POLYTHIOETHERAMIDE-IMIDE

[75] Inventors: Mitsutoshi Aritomi; Makoto Terauchi, both of Ibaraki, Japan

[73] Assignee: Mitsubishi Petrochemical Co., Ltd., Tokyo, Japan

[21] Appl. No.: 885,449

[22] Filed: Jul. 14, 1986

[30] Foreign Application Priority Data

Jul. 15, 1985 [JP] Japan ................. 60-155777

[51] Int. Cl.[4] ............................. C08G 73/14
[52] U.S. Cl. ..................... 528/352; 528/179; 528/188; 528/222; 528/226; 528/229; 528/350
[58] Field of Search .............. 528/352, 226, 350, 229, 528/188, 222, 179

[56] References Cited

U.S. PATENT DOCUMENTS 4,405,770  9/1983  Schoenberg et al. ............. 528/353
4,621,134  11/1986  Aritomi et al. .................... 528/337

*Primary Examiner*—Harold D. Anderson
*Attorney, Agent, or Firm*—Oblon, Fisher, Spivak, McClelland & Maier

[57] ABSTRACT

An aromatic polythioetheramide-imide having a recurring unit of the following general formula (II):

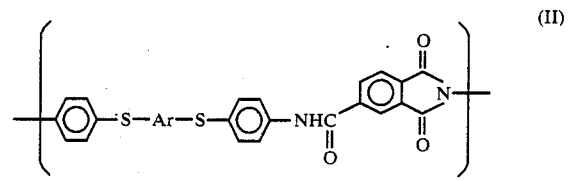

wherein —Ar—, which may be the same or different in the polymer, each represents a divalent aromatic residue. The aromatic polythioetheramide-imides are excellent in the balance of mechanical properties, heat resistance and moldability and can be used widely for parts in electric and electronic fields, housings, automobile parts, aircraft interior parts, sliding parts, gears, insulating materials, heat-resistant films, heat-resistant varnishes, heat-resistant fibers, etc.

2 Claims, 2 Drawing Figures

AROMATIC POLYTHIOETHERAMIDE-IMIDE

FIELD OF THE INVENTION

The present invention relates to aromatic polythioetheramide-imides that can be used widely for parts in electric and electronic fields, housings, automobile parts, aircraft interior parts, sliding parts, gears, insulating materials, heat-resistant films, heat-resistant varnishes, heat-resistant fibers, etc.

BACKGROUND OF THE INVENTION

It is known that aromatic polyamide-imides that are excellent in the balance of mechanical properties and heat resistance can be obtained by polycondensation of aromatic tricarboxylic anhydrides or their derivatives with aromatic diamines. However, aromatic polyamide-imides that have hitherto been generally proposed are unsatisfactory in that they are poor in melt moldability and will partially decompose under some molding conditions. To improve the moldability, various methods have been suggested such as the following:

1. A method that uses aromatic diamines having an ether linkage as disclosed in *Polymer Preprints*, 15 (1), page 761 (1974).
2. A method that improves the moldability by copolymerization as disclosed in Japanese Laid-Open Patent Application No. 91724/1983.

However, these methods are practically not satisfactory in view of the balance of moldability, heat resistance and mechanical strength that are taken into consideration as a whole.

SUMMARY OF THE INVENTION

An object of the present invention is to provide aromatic polythioetheramide-imides that are excellent in the balance of mechanical properties, heat resistance and moldability.

The object of the present invention can be attained by aromatic polythioetheramide-imides that can be obtained by reacting 1 mol of at least one of aromatic diamines having a thioether linkage of the following general formula (I):

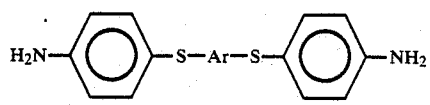

(I)

wherein —Ar—, which may be the same or different, each represents a divalent aromatic residue, with 0.99 to 1.01 mol of at least one of trimellitic anhydride and its halide of the following formulae:

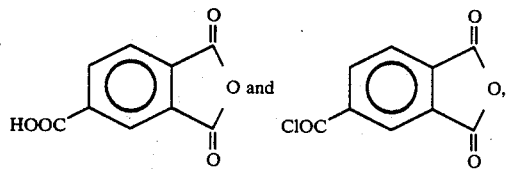

respectively, and have a recurring unit of the following general formula (II):

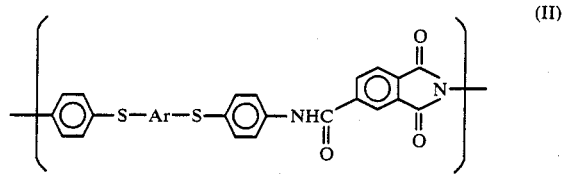

(II)

wherein —Ar—, which may be the same or different in the polymer, each represents a divalent aromatic residue.

DETAILED DESCRIPTION OF THE INVENTION

Figure 1:
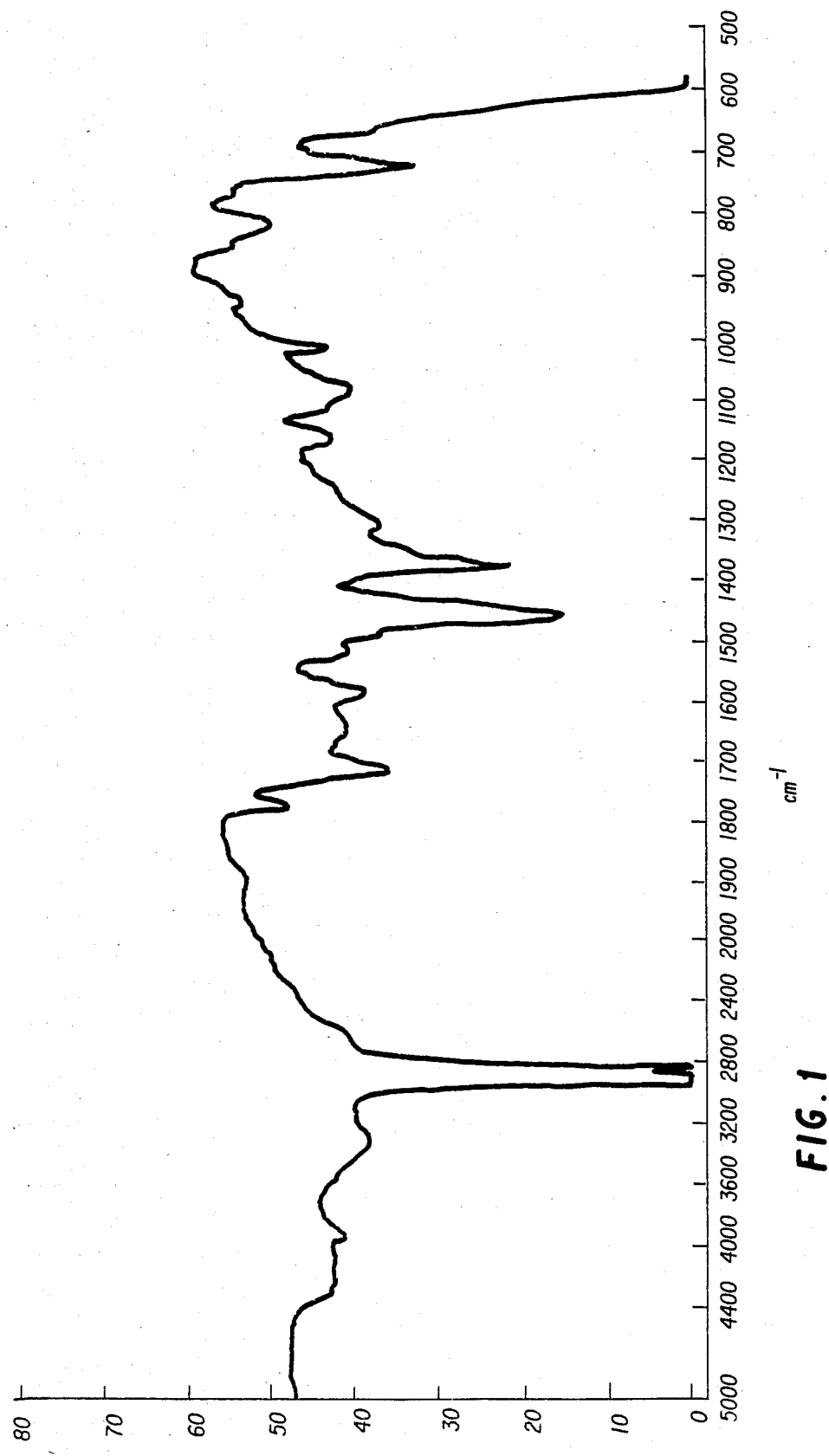
FIG. 1 shows the infrared absorption spectrum chart of the aromatic polythioetheramide-imide obtained in a manner described in Example 2.

Examples of aromatic diamines having a thioether linkage of the general formula (I) include 1,4-bis(4-aminophenylthio)benzene, 1,3-bis(4-aminophenylthio)benzene, 2,4-bis(4-aminophenylthio)nitrobenzene, 2,5-dimethyl-1,4-bis(4-aminophenylthio)benzene, 4,4'-bis(4-aminophenylthio)biphenyl, 4,4'-bis(4-aminophenylthio)diphenyl ether, 4,4'-bis(4-aminophenylthio)diphenyl sulfide, 1,4-bis[4-(4-aminophenylthio)phenylthio]benzene, α,ω-diaminopoly(1,4-thiophenylene) oligomer, 4,4'-bis(4-aminophenylthio)benzophenone, 4,4'-bis(4-aminophenylthio)diphenyl sulfoxide, 4,4'-bis(4-aminophenylthio)diphenyl sulfone, 3,3'-bis(4-aminophenylthio)diphenyl sulfone, 2,2-bis[4-(4-aminophenylthio)phenyl]propane, 4,4'-bis(4-aminophenylthio)diphenylmethane, etc.

Of these, preference is given to those diamines having as —Ar— a divalent aromatic residue of the following general formula:

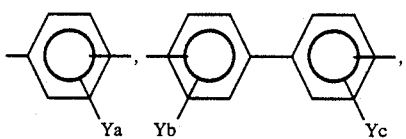

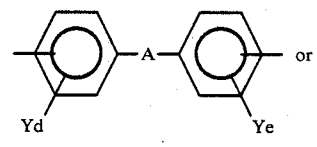

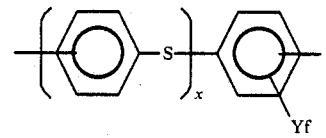

wherein A represents —O—, —CO—, —SO—, —SO$_2$— or —C$_y$H$_{2y}$— in which y is an integer of from 1 to 10, Y represents an alkyl group having 1 to 20 carbon atoms, an aralkyl group having 7 to 20 carbon atoms, a cycloalkyl group having 3 to 20 carbon atoms, an aryl group having 6 to 20 carbon atoms, halogen or a nitro group, a, b, c, d, e and f each is 0 or an integer of from 1 to 4, and x is a number of from 0 to 20.

The aromatic polythioetheramide-imides of the present invention can be prepared by using any known methods that have been hitherto proposed generally. Two typical examples of such methods that are highly practical are:

(1) Acid Chloride Method

A method wherein trimellitic anhydride chloride is reacted with aromatic diamines as disclosed in Japanese Patent Publication No. 15637/1967.

(2) Direct Polymerization Method

A method wherein trimellitic anhydride is reacted with aromatic diamines in the presence of a phosphorous compound catalyst as disclosed in Japanese Patent Publication No. 4077/1974.

Of these two methods, the acid chloride method is preferable because the raw materials are relatively readily available and a higher degree of polymerization can be attained under moderate conditions.

The acid chloride method is now further described in detail below.

First Step 1.00 mol of at least one of aromatic diamines having a thioehter linkage of the following general formula (I):

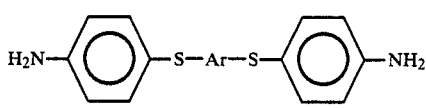

(I)

wherein —Ar— has the same significance as in the above general formula (I), and 0.99 to 1.01 mol of trimellitic anhydride chloride are dissolved in an organic polar solvent, and the solution is stirred at a temperature of −20° C. to +80° C. and preferably −10° C. to +30° C. for 1 to 10 hours in the presence of a hydrogen chloride trapping agent to produce a polyamide-amic acid having a recurring unit of the following general formula:

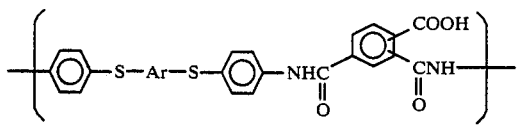

wherein —Ar— has the same significance as in the above general formula (II).

As organic polar solvents used in the first step can be mentioned organic polar aprotic solvents such as N,N-dimethylformamide, N,N-dimethylacetamide, N,N-dimethylpropionamide, N,N-dimethylbenzamide, N-methylpyrrolidone, N-methylpiperidone, N-methyl-ε-caprolactam, hexamethylphosphoramide, tetramethylurea, sulfolane, dimethyl sulfoxide, and the mixtures thereof, with N,N-dimethylformamide, N,N-dimethylacetamide and N-methylpyrrolidone being particularly preferred.

As hydrogen chloride trapping agents added in the first step can be mentioned (a) aliphatic tertiary amines (e.g., trimethylamine, triethylamine, tributylamine, etc.), (b) cyclic organic bases (e.g., pyridine, quinoline, pyrimidine, 2,6-lutidine, etc.), (c) alkali metal hydroxides, (d) alkali metal carbonates, (e) alkali metal acetates, (f) alkaline earth metal oxides, (g) alkaline earth metal hydroxides, (h) alkaline earth metal carbonates, (i) alkaline earth metal acetates, (j) organic oxide compounds (e.g., ethylene oxide, propylene oxide, etc.), etc. However, if an organic acid amide type solvent such as N-methylpyrrolidone is used as a reaction solvent, a hydrogen chloride trapping agent is not necessarily added.

Second Step

The polyamide-amic acid obtained in the first step is dehydrated to perform a ring closing reaction to produce the aromatic polythioetheramide-imide of the present invention. This step can be carried out in either a liquid phase or a solid phase.

In the ring closing method in a liquid phase, there are a thermal ring closing process and a chemical ring closing process. In the thermal ring closing process, the polyamide-amic acid solution is heated to 50° to 400° C. and preferably 120° to 250° C. In this case, it is more effective to use an azeotropic solvent useful for the removal of water such as benzene, toluene, xylene, chlorobenzene, etc. In the chemical ring closing process, to the polyamide-amic acid solution is added (a) an aliphatic anhydride (e.g., acetic anhydride, propionic anhydride, etc.), (b) a halogen compound (e.g., phosphorus oxychloride, thionyl chloride, etc.), or (c) a chemical dehydrator (e.g., molecular sieves, silica gel, alumina, phosphorus pentachloride, etc.), and the reaction is carried out at 0° to 120° C. and preferably 10° to 60° C.

The aromatic polythioetheramide-imide produced by a ring closing reaction in a liquid phase is present generally in the state of a solution, and therefore, the solution is diluted with a solvent that does not dissolve the polymer but is compatible with the reaction solvent to precipitate the polymer, which is filtered to be isolated.

On the other hand, in the ring closing method in a solid phase, the polyamide-amic acid solution is charged into water or methanol to isolate the polymer and the polymer is heat-treated at 150° to 350° C. However, care should be taken since the balance of mechanical properties and fluidity of the polymer when melted will lower if the polymer is heated at a high temperature of 250° C. or above for a longer period.

The Polymer

The aromatic polythioetheramide-imides of the present invention have a glass transition temperature of 150° to 300° C., and the inherent viscosity of the N-methylpyrrolidone solution containing 0.2% by weight of the polymer at 30° C. is at least 0.2 dl/g.

When the polymer of the present invention is molded, various known filler components can be added. Typical examples of filler components include (a) fibrous fillers such as glass fiber, carbon fiber, boron fiber, aramid fiber, alumina fiber, silicon carbide fiber, etc., and (b) inorganic fillers such as mica, talc, clay, graphite, carbon black, silica, asbestos, molybdenum sulfide, magnesium oxide, calcium oxide, etc.

The present invention will now be explained with reference to the following Examples. However, this invention should not be construed as in any way limited to the following Examples.

EXAMPLE 1

10.7 g of 4,4'-bis(4-aminophenylthio)benzophenone (0.025 mol) and 20 ml of N-methylpyrrolidone were charged into a 500 ml four-necked flask equipped with a thermometer, a water separator having a Liebig condenser, a solid inlet, and a nitrogen gas inlet. Then, 5.26 g of trimellitic anhydride chloride (0.025 mol) in the solid form were added to the mixture at 0° C. under a flow of nitrogen with vigorous stirring. Thereafter, the stirring was continued for 2 hours while the temperature is allowed to increase gradually to room temperature.

Then, 20 ml of N-methylpyrrolidone (NMP) and 20 ml of toluene were added and the mixture was heated at 150° C. for 4 hours. The water produced during the treatment was azeotropically removed together with the toluene. After the reaction mixture was cooled to room temperature, the mixture was charged into water to allow the produced polymer to precipitate, and the polymer was filtered, ground, washed with water, and dried at 150° C. for 8 hours in a vacuum oven to obtain the aromatic polythioetheramide-imide having the following physical properties in a yeild of 14.5 g (99% of theory).

Inherent viscosity: 0.60 dl/g (measured at 30° C. as an NMP solution containing 0.2 wt % of the polymer).

Glass transition temperature: 240° C.

Thermal decomposition starting temperature: 448° C.

Infrared absorption spectrum (according to the Nujol method): 1780 cm$^{-1}$ and 1720 cm$^{-1}$ (imide), 1640 cm$^{-1}$ and 1525 cm$^{-1}$ (amide), 1640 cm$^{-1}$ (ketone), 1080 cm$^{-1}$ (thioether), and 820 cm$^{-1}$, 760 cm$^{-1}$ and 720 cm$^{-1}$ (aromatic ring).

When this polymer was compression molded 320° C., a yellow tough resin plate having a tensile strength of 870 kg/cm$^2$ and a tensile modulus of 2.6×10$^4$ kg/cm$^2$ was obtained.

EXAMPLE 2

Example 1 was repeated except that 10.7 g of 4,4'-bis(4-aminophenylthio)benzophenone was substituted for 8.1 g of 1,4-bis(4-aminophenylthio)benzene (0.025 mol), resulting in an aromatic polythioetheramide-imide having the following physical properties in a yield of 11.8 g (98% of theory).

Inherent viscosity: 0.20 dl/g (measured at 30° C. as an NMP solution containing 0.2 wt % of the polymer).

Glass transition temperature: 214° C.

Softening point: 349° C.

Infrared absorption spectrum (according to the Nujol method; see FIG. 1): 1775 cm$^{-1}$ and 1720 cm$^{-1}$ (imide), 1650 cm$^{-1}$ and 1520 cm$^{-1}$ (amide), 1080 cm$^{-1}$ (thioether) and 810 cm$^{-1}$, 760 cm$^{-1}$ and 720 cm$^{-1}$ (aromatic ring).

This polymer could be compression molded at 360° C. It was confirmed that this polymer had a recurring unit of the following formula:

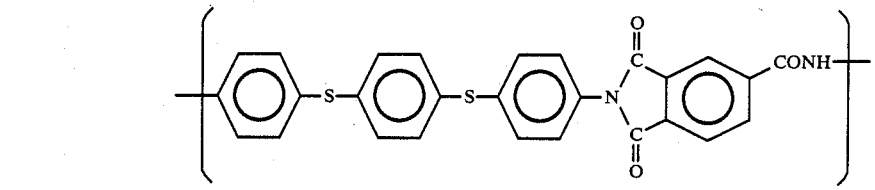

EXAMPLE 3

Example 1 was repeated except that 10.7 g of 4,4'-bis(4-aminophenylthio)benzophenone was substituted for 10.8 g of 4,4'-bis(4-aminophenylthio)diphenyl sulfide (0.025 mol), resulting in a polymer having the following physical properties in a yield of 14.6 g (99% of theory).

Inherent viscosity: 0.25 dl/g (measured at 30° C. as an NMP solution containing 0.2 wt % of the polymer).

Glass transition temperature: 184° C.

Softening point: 298° C.

Infrared absorption spectrum (according to the Nujol method): 1770 cm$^{-1}$ and 1715 cm$^{-1}$ (imide), 1640 cm$^{-1}$ and 1510 cm$^{-1}$ (amide), 1070 cm$^{-1}$ (thioether) and 805 cm$^{-1}$, 760 cm$^{-1}$ and 720 cm$^{-1}$ (aromatic ring).

This polymer could be compression molded at 310° C.

EXAMPLE 4

Example 1 was repeated except that 10.7 g of 4,4'-bis(4-aminophenylthio)benzophenone was substituted for 11.6 g of 4,4'-bis(4-aminophenylthio)diphenyl sulfone (0.025 mol), resulting in a polymer having the following physical properties in a yield of 15.3 g (99% of theory).

Inherent viscosity: 0.30 dl/g (measured at 30° C. as an NMP solution containing 0.2 wt % of the polymer).

Glass transition temperature: 253° C.

Figure 2:
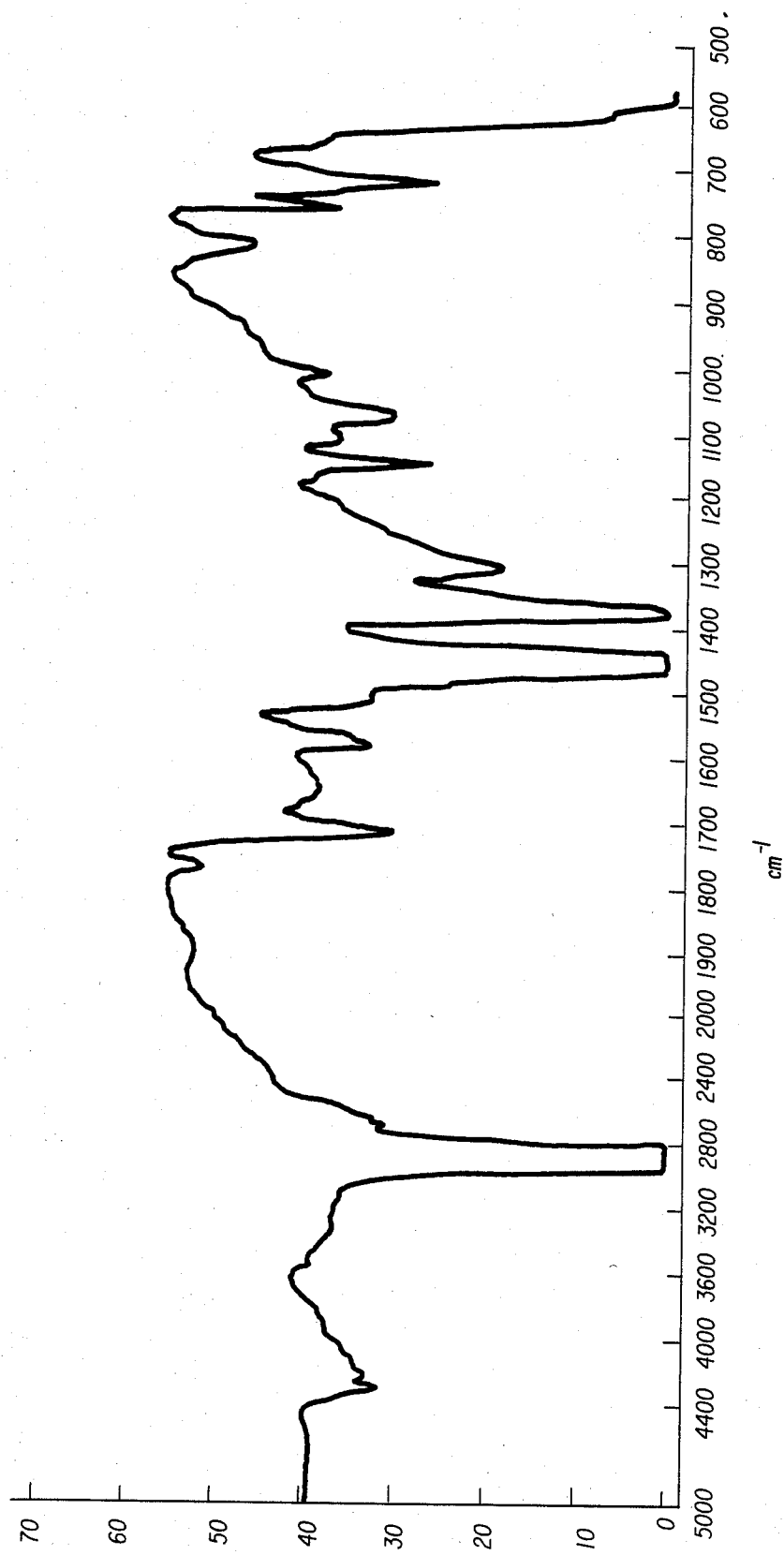
FIG. 2 shows the infrared absorption spectrum chart of the aromatic polythioetheramide-imide obtained in a manner described in Example 4.

Infrared absorption spectrum (according to the Nujol method; see FIG. 2): 1775 cm$^{-1}$ and 1720 cm$^{-1}$ (imide), 1650 cm$^{-1}$ and 1610 cm$^{-1}$ (amide), 1150 cm$^{-1}$ (sulfone), 1070 cm$^{-1}$ (thioether) and 820 cm$^{-1}$, 760 cm$^{-1}$ and 720 cm$^{-1}$ (aromatic ring).

This polymer could be compression molded at 300° C. and had a recurring unit of the following formula:

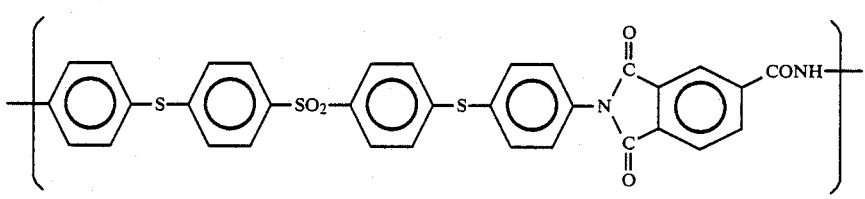

EXAMPLE 5

Example 1 was repeated except that 10.7 g of 4,4'-bis(4-aminophenylthio)benzophenone was substituted for 10.0 g of 4,4'-bis(4-aminophenylthio)biphenyl (0.025 mol), resulting in a polymer having the following physical properties in a yield of 13.8 g (99% of theory).

Inherent viscosity: 0.42 dl/g (measured at 30° C. as an NMP solution containing 0.2 wt % of the polymer).

Glass transition temperature: 253° C.

Infrared absorption spectrum (according to the Nujol method): 1775 cm$^{-1}$ and 1720 cm$^{-1}$ (imide), 1640 cm$^{-1}$ and 1510 cm$^{-1}$ (amide), 1080 cm$^{-1}$ (thioether) and 805 cm$^{-1}$, 760 cm$^{-1}$ and 720 cm$^{-1}$ (aromatic ring).

While the invention has been described in detail and with reference to specific embodiments thereof, it will be apparent to one skilled in the art that various changes and modifications can be made therein without departing from the spirit and scope thereof.

What is claimed is:

1. An aromatic polythioetheramide-imide having a recurring unit of the following general formula (II):

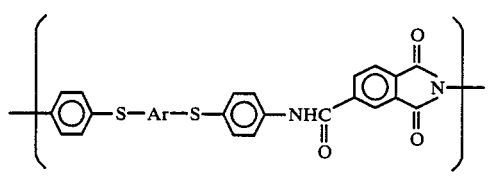

(II)

2. An aromatic polythioetheramide-imide as claimed in claim 1, wherein said divalent aromatic residue has the following general formula:

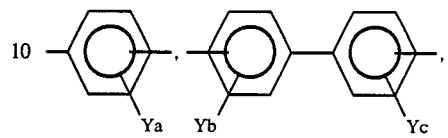

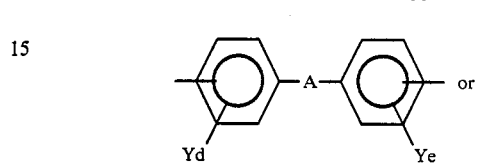

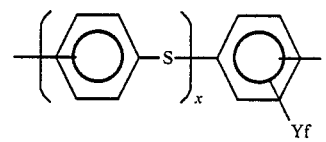

wherein —Ar—, which is the same or different each occurrence in the polymer, each represents a divalent aromatic residue.

wherein A represents —O—, —CO—, —SO—, —SO$_2$— or —C$_y$H$_{2y}$— in which y is an integer of from 1 to 10, Y represents an alkyl group having 1 to 20 carbon atoms, an aralkyl group having 7 to 20 carbon atoms, a cycloalkyl group having 3 to 20 carbon atoms, an aryl group having 6 to 20 carbon atoms, halogen or a nitro group, a, b, c, d, e and f each is 0 or an integer of from 1 to 4, and x is a number of from 0 to 20.

* * * * *